Feb. 16, 1965 — J. B. LONG ETAL — 3,169,796
CONTINUOUS MINER HAVING PIVOTALLY MOUNTED HEAD
Filed April 25, 1961 — 8 Sheets-Sheet 1

INVENTORS
JOHN B. LONG
ALLEN N. BLAIR
BY
ATTORNEYS

Feb. 16, 1965   J. B. LONG ETAL   3,169,796
CONTINUOUS MINER HAVING PIVOTALLY MOUNTED HEAD
Filed April 25, 1961   8 Sheets-Sheet 2

INVENTORS
JOHN B. LONG
ALLEN N. BLAIR
BY Rommel, Allwine & Rommel
ATTORNEYS

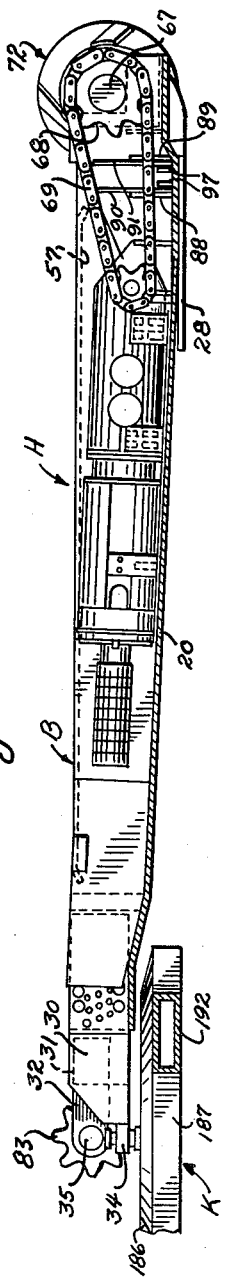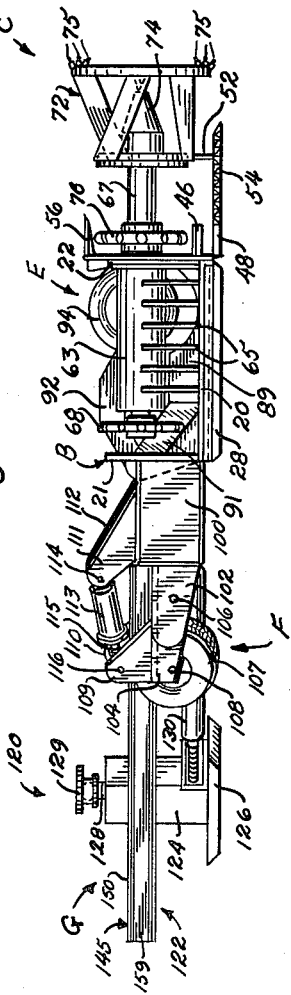

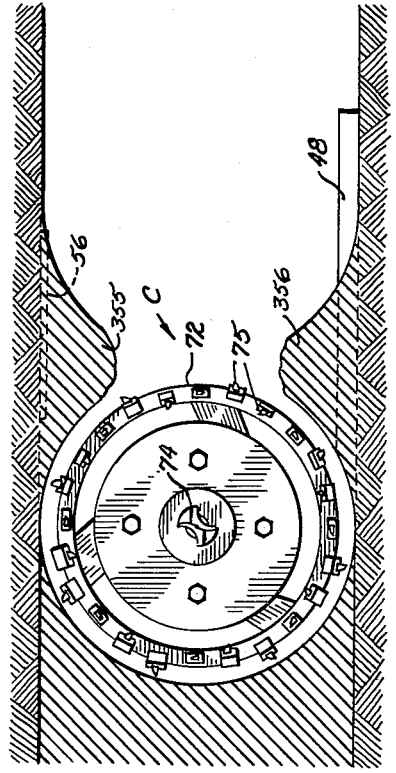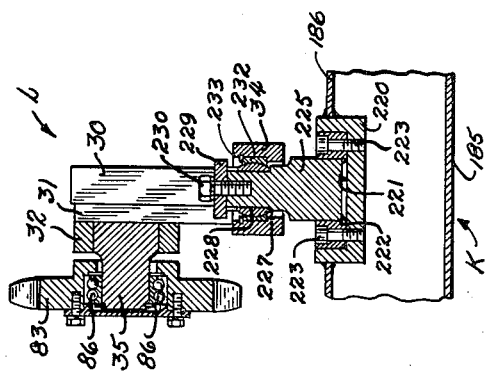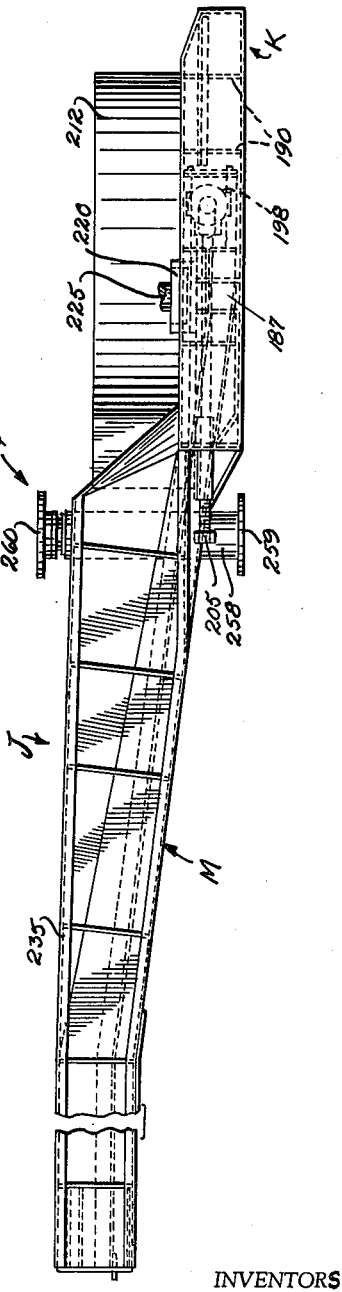

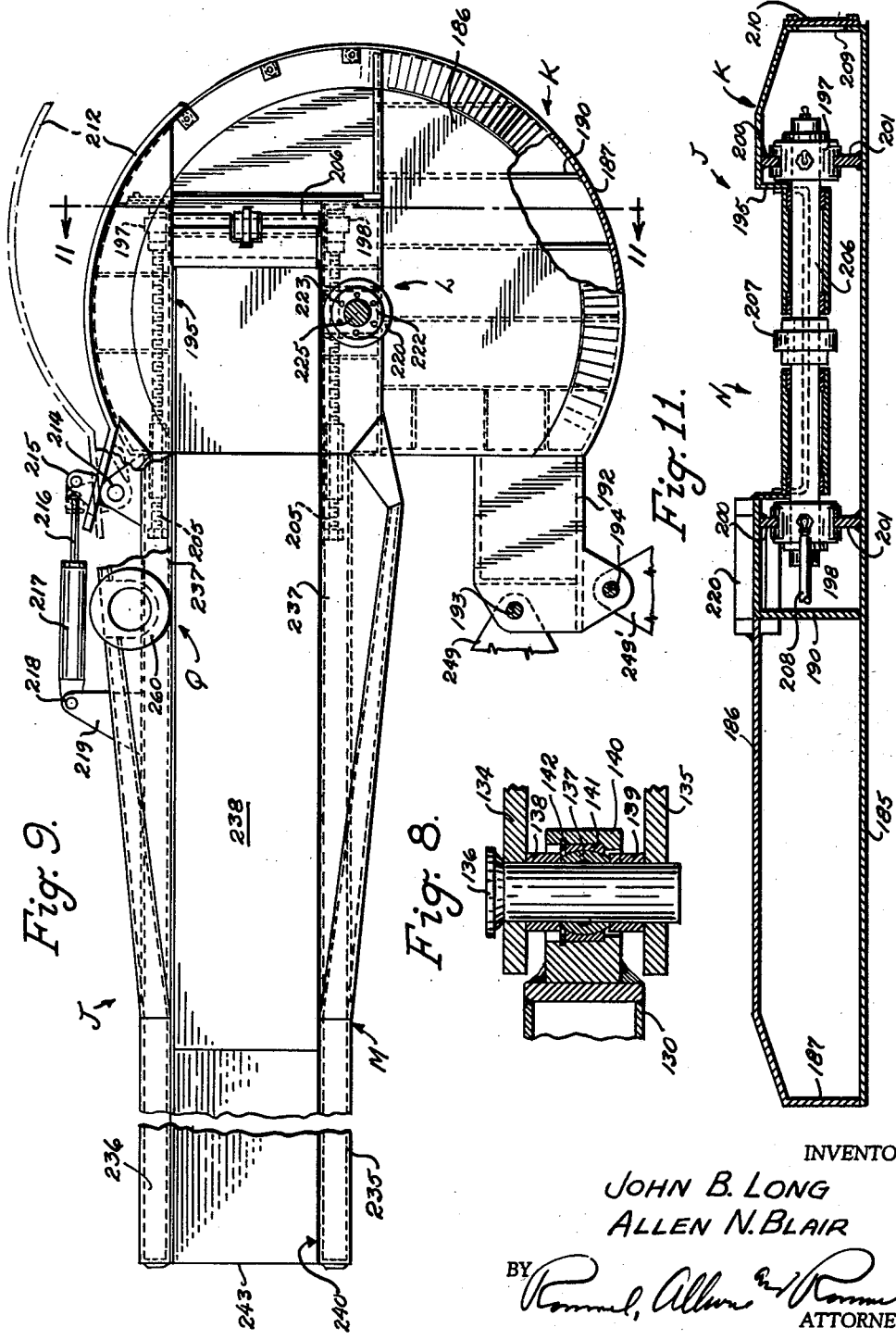

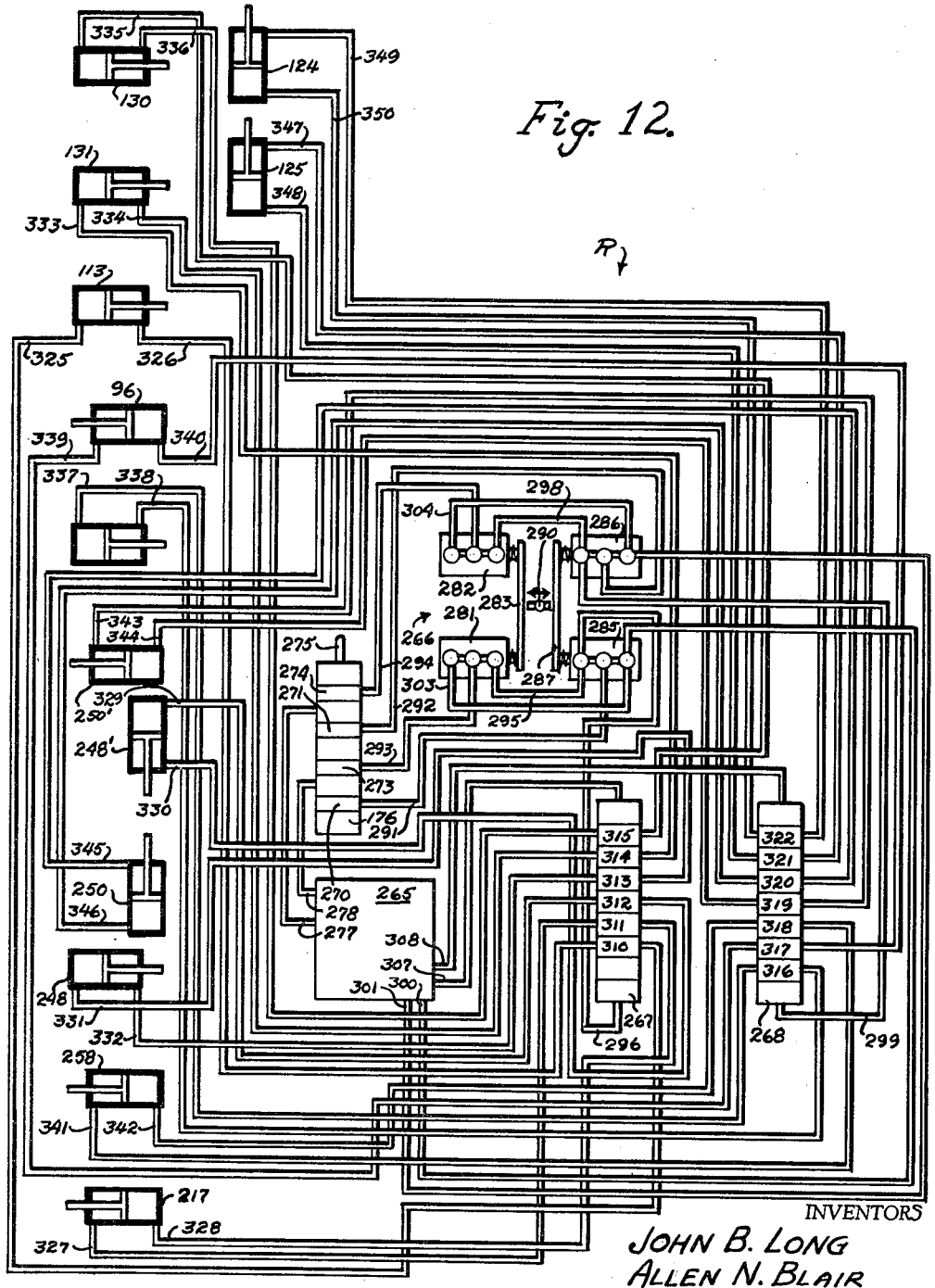

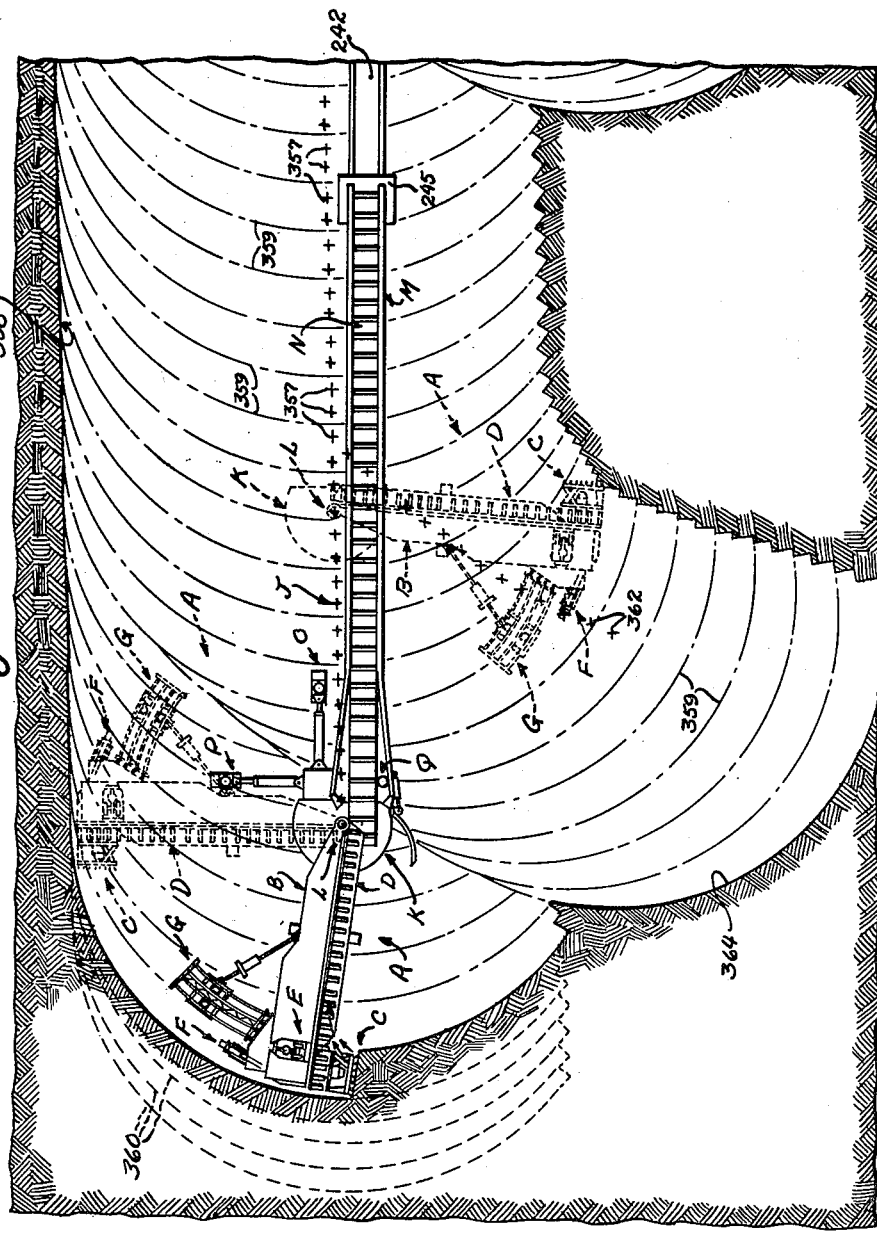

3,169,796
Patented Feb. 16, 1965

3,169,796
CONTINUOUS MINER HAVING PIVOTALLY MOUNTED HEAD
John B. Long, Oak Hill, and Allen N. Blair, Beckley, W. Va., assignors to Marmon-Herrington Company, Inc., Indianapolis, Ind., a corporation of Indiana
Filed Apr. 25, 1961, Ser. No. 105,394
10 Claims. (Cl. 299—31)

This invention relates to improvements in continuous miners.

The continuous miner herein shown and described has been designed primarily for use in mining thin coal seams of from 24 inches to 42 inches, although it will be readily understood that the use thereof is not so limited.

Conventional mobile crawler mounted continuous miners do not adequately provide for a continuous mining operation in thin seams, the same applying thrust based on weights from 40 to 60 tons and therefore being virtually unmanageable and unserviceable when crowded into a thin seam. Maximum thrust is extremely important in providing a satisfactory continuous mining operation and, in order to provide for maximum thrust without unmanageable bulk and weight, the thrust must be applied independently of the weight and bulk of the machine. One of the primary objects and advantages of our invention is therefore to provide a continuous miner that will apply maximum thrust independently of the weight and bulk of the miner.

A further object is the provision of a miner that will mine a high percentage of optimum size material, rather than a high percentage of slack material.

A further object is the provision of a continuous miner that may be remotely driven and manipulated and provide maximum tonnage per man hour.

A further object is the provision of a continuous miner having a novel conveying means whereby the mined material may be conveyed from the mine face, such novel conveying means including a provision for the continuous conveying of the mined material during the mining operation.

A further object is the provision of a continuous miner having improved advancing and retracting means for the application of maximum thrust thereto, including associated guide means whereby the miner may be driven along a predetermined path.

A further object is the provision of a continuous miner having novel guide means for selective mining at a predetermined level.

A further object is the provision of a continuous miner having an improved interconnection between the miner and the conveyor to which the mined material is conveyed.

A further object is the provision of a continuous miner having improved cutting means that may be vertically and angularly adjusted according to the size of the bit used, and to provide an angular cut, if desired.

Other objects and advantages of the invention will be apparent during the course of the following detailed description, taken in connection with the accompanying drawings, forming a portion of this specification, and in which drawings:

FIG. 2 is a top plan view of the miner, with the top thereof removed to disclose preferred details.

FIG. 3 is a longitudinal sectional view of the miner, taken substantially on the line 3—3 of FIG. 2.

FIG. 4 is a longitudinal sectional view of the miner taken substantially on the line 4—4 of FIG. 2.

FIG. 5 is an end view of the miner, with parts thereof removed to disclose preferred details.

FIG. 7 is an enlarged sectional view taken substantially on the line 7—7 of FIG. 2.

FIG. 8 is an enlarged sectional view taken substantially on the line 8—8 of FIG. 2.

FIG. 9 is a top plan view of the bridge conveyor of the continuous miner.

FIG. 10 is a side view of the bridge conveyor of the continuous miner.

FIG. 11 is an enlarged sectional view taken substantially on the line 11—11 of FIG. 9.

FIG. 12 is a diagrammatic view of the hydraulic system of my continuous miner.

FIG. 13 is a somewhat diagrammatic view through a cut of the miner.

FIGS. 14 and 15 are somewhat diagrammatic views illustrating the steps of mining with my continuous miner.

Figure 1:
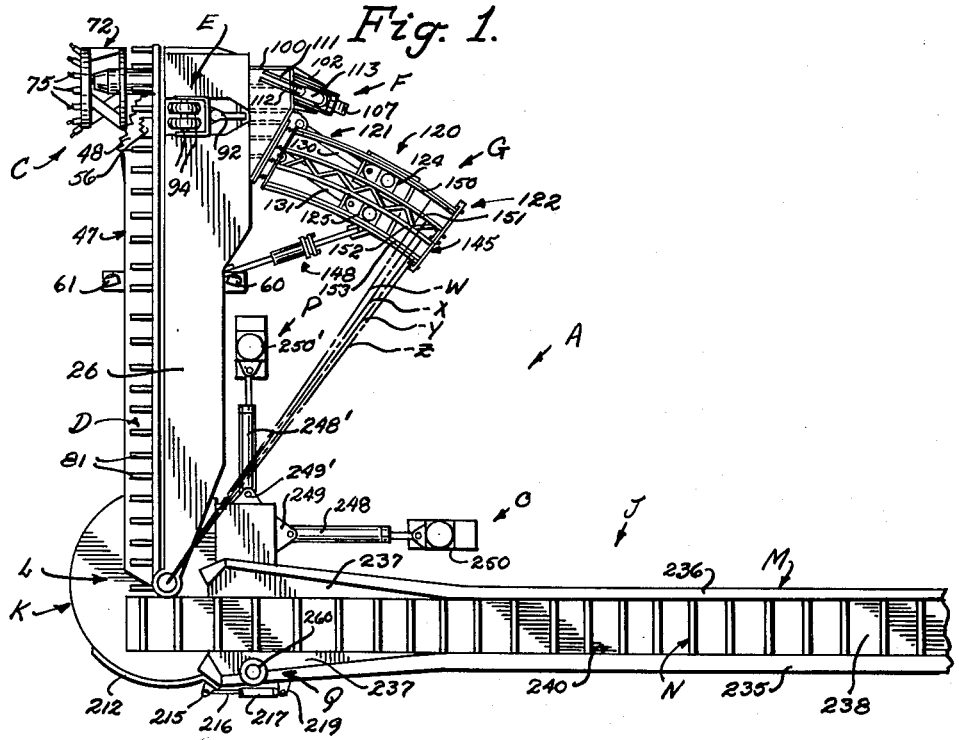
FIG. 1 is a somewhat diagrammatic top plan view of our improved continuous miner and bridge conveyor.

In the drawings, wherein for the purpose of illustration is shown a preferred embodiment of the invention, and wherein similar reference characters designate corresponding parts throughout the several views, the letter A may generally designate the miner, which includes a frame B; cutting means C; conveying means D; front guide means E; rear guide means F; miner advancing and retracting means G; power means H; a bridge conveyor J which includes base means K, pivot means L, conveying frame M, conveying means N, conveyor advancing and retracting means O, conveyor transverse positioning means P and conveyor anchoring means Q; and a hydraulic system R.

It is to be noted that the various conduits of hydraulic circuitry have been omitted in all views except those diagrammatically illustrating such circuitry, inasmuch as these conduits would serve to further complicate and render indistinct structural characteristics.

The frame B preferably includes a bottom plate 20, a rear plate 21, and a front plate 22, the plates 20, 21 and 22 being interconnected to define a chamber 24 within which the power means H and various other parts are housed. A cover 26 may be provided over the chamber 24, for shielding the same from undesirable materials and protecting miners from injury through inadvertent contact with the moving parts housed therewithin.

A skid shoe 28 may be secured to the bottom plate 20, adjacent the cutting means C, providing a reinforced surface which slidably engages the mine floor.

Secured to the side plate 22, opposite the end of the frame B from the cutting means C, are a plurality of reinforced supporting plates 30, 31 and 32, the plate 30 being provided at the outermost end with a sleeve 34. The sleeve 34 forms a part of the pivot means L, as will be subsequently described. The plate 32 has secured thereto a shaft 35 which forms a support for one end of the conveying means D, as will be subsequently described.

Secured to the plate 22 is a reinforcing plate 40. The reinforcing plate 40 is provided with a plurality of slots 42 within which are slidably received the shanks of bolts 43 which secure the plate 40 to the plate 22. Secured to the plate 40, and extending outwardly therefrom, opposite to the plate 22, are the lower chain guide lug 46, the conveyor chain pan 47 and the bottom trimmer bar 48. The slots 42 permit vertical adjustment of these elements so that the bottom trimmer bar 48 lies adjacent the mine floor, the conveyor pan is maintained in juxtaposition for receiving the mined material, and the chain guide lug 46 maintains the conveying means D in proper position with respect to the conveyor chain pan for movement of the mined material therealong. The conveyor chain pan 47 is open at the forward end 50 thereof, adjacent the cutting means C. The pan 47 is provided with a side plate 52 for the greater portion of the frame B, forming a channel 53 through which the mined material may be moved along the length of the frame B and onto the bridge conveyor J. It will be noted that the side plate 52 serves to store mined material within the chamber 53 during the withdrawal of the frame B from the mine face and thereby provides a substantially continuous flow of material to the bridge conveyor J. The bottom trimmer 48 is provided with a plurality of serrations 54, forming a saw-tooth edge adjacent the cutting means C, for a purpose to be subsequently described.

Secured to the plate 22 by a reinforcing flange 55, and extending outwardly from the chamber 24, is an upper trimmer bar 56 and an upper chain guide 57. The upper trimmer bar 56 is provided with a plurality of serrations 58 that form a saw-tooth edge which cooperates with the cutting means C, as will be subsequently described. The upper chain guide 57 cooperates with the conveying means D in supporting the upper reach thereof.

A headlight 60 may be secured to the plate 21 and a headlight 61 secured to the side plate 52 of the conveyor chain pan 47 for illuminating purposes.

Cutting means C preferably includes a bearing housing 63 that is suitably supported within the chamber 24, such as by a plurality of braces 65, adjacent the opposite end of the frame B from the pivot sleeve 34. The bearing housing 63 supports a shaft 67 having at one end thereof a sprocket 68 about which is entrained a drive chain 69 interconnected with the power means H, as will be subsequently described. The shaft 67 is rotated by the sprocket 68, through interconnection with the drive chain 69. A sprocket 70 is secured to the shaft 67, outwardly of the chamber 24 and in juxtaposition with respect to the conveyor chain pan 47 to drive the conveying means D. A cutting head which may comprise a cutting drum 72 is mounted upon shaft 67, extending outwardly beyond the frame B and the upper and lower trimming bars 56 and 48. The cutting drum 72 is removably secured to the shaft 67 by lock nut 74 and is provided with a plurality of removable bits 75 which engage the mine face.

The conveying means D preferably includes a chain 80 having a plurality of flights 81 spaced therealong, the chain 80 being entrained about the sprocket 70 of the cutting means C, guided at the lower portion thereof, adjacent the sprocket 70, by the lower chain guide 46, and moving along the conveyor chain pan 47 from adjacent the bottom trimmer bar 48, across the open portion 50 to a position for discharge onto the bridge conveyor J, about idler sprocket 83, mounted upon the shaft 35, and over the upper chain conveyor guide 57. The sprocket 83 is supported upon the shaft 35 by bearings 86 so that the same is freely rotatable.

Inasmuch as the chain 80 is rotated through interconnection with the sprocket 70 attached to the shaft 67 of the cutting means C, it will be seen that we have provided conveying means for the continuous miner that is intimately correlated to the cutting means thereof.

The front guide means E and rear guide means F cooperate to vertically and angularly guide the cutting means C. In reality, the rear guide means F is sufficient to guide the cutting means C, however, the front guide means E has been included and is utilized to insure the correct vertical and angular adjustment of the cutting means C with respect to the mine roof.

The front guide means E preferably includes a pair of spaced apart supporting plates 88 and 89 secured to the plate 20, within the chamber 24; a pair of mounting plates 90 and 91 secured respectively to the plates 88 and 89 extending outwardly from the chamber 24, beyond the plate 21; a bracket 92 pivotally secured to the plates 90 and 91 by means of pin 93, wheels 94 being rotatably secured to the bracket 92 by means of axle 95; and means for positioning the wheels 94 with respect to the frame B including a hydraulic cylinder 96 pivotally supported upon plate 20 by interconnection with the pivot plates 97. The cylinder 96 includes a shaft 98 that is rigidly secured to the bracket 92 by means of pin 99.

Figure 6:
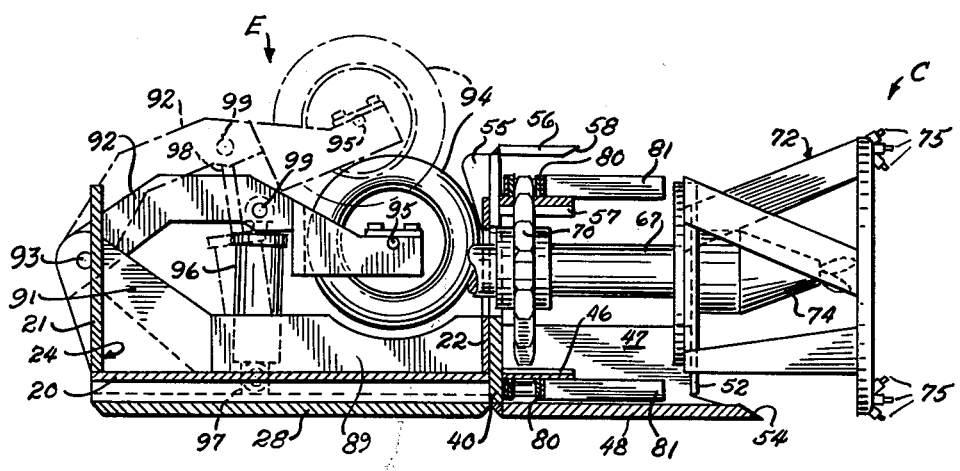
FIG. 6 is an enlarged transverse sectional view taken substantially on the line 6—6 of FIG. 2.

As will be seen from FIG. 6, the wheel 94 may be lowered to substantially within the chamber 24 and raised by the hydraulic cylinder 96 to the desired height for abutment against the mine roof in guiding the cutting means C.

A support 100 is secured to the plate 21, extending outwardly therefrom, without the chamber 24, providing a support for the rear guide means F and miner advancing and retracting means G.

The rear guide means F preferably includes a pair of parallel side plates 102 and 103 secured to the support 100; parallel brackets 104 and 105 hingedly secured to the plates 102 and 103 by means of pin 106, and a wheel 107 rotatably supported between the brackets 104 and 105 by axle 108. The brackets 104 and 105 are respectively provided with upstanding ear portions 109 and 110. The support 100 is provided with a pair of upstanding plates 111 and 112. Means for pivotally moving the wheel with respect to the plates 102 and 103 preferably comprises a hydraulic cylinder 113 pivotally secured between the plates 111 and 112 by pin 114, the cylinder 113 having a shaft 115 that is pivotally attached between the ear portions 109 and 110 by pin 116. It will thus be seen that by manipulation of the hydraulic cylinder 113, the wheel 107 may be raised or lowered with respect to the frame B, about the pin 106. It will be noted that the support 100 and the plates 102 and 103 provide a lever for the wheel 107, about the skid shoe 28 which abuts a fulcrum, so that considerable pressure may be exerted to guide the cutting means C.

In continuous miners of this type, the rotation of the cutting drum 72 acts to raise the cutting drum and the weight of the machine has been utilized in the past to maintain proper cutting contact. However, by use of the lever and fulcrum construction of our invention we have been able to reduce the bulk and weight and still maintain proper cutting contact. In usual straight line cutting with our continuous miner the wheels 94 are raised into contact with the roof, providing a stabilizing action for the frame B and skid shoe 28, and the wheel 107 is lowered into contact with the mine floor, acting as a lever about the fulcrum (supporting means for the miner, usually the mine floor) to guide the cutting means C in a straight line. If a downwardly angled cut is desired, downward pressure is exerted on the wheel 107, by power actuated means which may comprise cylinder 113, and the leverage about the fulcrum causes depression of the cutting means C. When an upwardly angled cut is desired, the wheel 107 is raised and the cutting action of the cutting means C, which constantly exerts an upward force by its rotation, will raise the cutting means C to its desired upwardly inclined angle.

We have thus provided a novel guide means wherein the frame B abuts a fulcrum; the support 100 and brackets 102 and 103 and cutting means C constitute arms of the lever extending to opposite sides of the frame B; and means, which we have shown as the cylinder 113, for the application of a leverage force adjacent the ends of brackets 102 and 103 for tilting the lever thus provided about its fulcrum.

The miner advancing and retracting means G preferably includes anchor means 120 which provide base points for movement of the miner A; means 121 for advancing and retracting the miner A with respect to the anchor means 120, and guide bracket means 122 for guiding movement of the anchor means 120.

The anchor means 120 preferably includes a pair of hydraulic jacks 124 and 125 mounted respectively upon skid brackets 126 and 127, each jack having a shaft 128 to which is secured a plate 129. These packs 124 and 125 are commonly referred to in the art as "walking jacks," the bases 126 and 127 being designed to abut against the mine floor and the plates 129 being pivotally secured upon the shafts 128 so that they may abut against and follow the contour of the mine roof.

The means 121 for advancing and retracting the anchor means 120 with respect to the frame B preferably comprises a pair of hydraulic cylinders 130 and 131 that are respectively pivotally attached at one end thereof by brackets 132 and 133 to the support 100, and are respectively attached at the other end thereof to the jacks 124 and 125. The interconnection of the jacks 124 and 125 with their respective cylinders 130 and 131 is shown in FIG. 8. In this connection, the jacks are each provided with a pair of spaced apart bracket plates 134 and 135 with a pin 136 provided extending therebetween. A self-aligning bushing 137 is supported upon the pin 136 in a spaced relationship with respect to plates 134 and 135 by spacers 138 and 139. The hydraulic cylinders 130 and 131 are each provided with a sleeve 140 within which is received a socket 141 which interfits about the self-aligning bushing 137. Retaining ring 142 secures the socket 141 within the sleeve 140. Such interconnection of the cylinders 130 and 131 with the jacks 124 and 125 permits a limited angular vertical movement of the hydraulic cylinders 130 and 131 with respect to their respective jacks 124 and 125, such as will occur when the cutting means C operates other than in a horizontal plane.

The guide bracket means 122 for guiding movement of the anchor means 120 is best shown in FIG. 2, and comprises guide frame means 145, support means 147, and radius guide rod means 148.

The guide frame means 145 preferably includes arched guide plates 150, 151, 152 and 153. The plates 150 and 151 define an elongated slideway 155 which receives, in sliding engagement therewith, the jack 124; and the plates 152 and 153 define a slideway 157 within which is received, in sliding engagement, the jack 125. Suitable reinforcing plates 159 and 160 may be secured respectively to the guide plates 150 and 153, exteriorly of the respective slideways 155 and 157; reinforcing structure 162 interconnecting the plates 151 and 152, exteriorly of the slideways 155 and 157; and end plates 164 and 165 interconnecting the guide plates 150, 151, 152 and 153 at each end of the slideways 155 and 157.

As shown in FIG. 1, the guide plate 150 is arched radially from the pivot means L at a radius W; the plate 151 arched radially from the pivot means L at a radius X; the plate 152 arched radially from the pivot means L at a radius Y; and the guide plate 153 arched radially from the pivot means L at a radius Z. Therefore, the jacks 124 and 125 being in respective sliding engagement with the slideways 155 and 157 will themselves move and will move the frame B of the miner A radially about the pivot means L.

The support means 147 for the guide frame means 145 preferably includes a plurality of springs 167 interconnecting the end plate 164 to the support 100. These springs 167 are of substantially heavy construction and will horizontally support the guide frame means 145 with respect to the frame B. The springs 167 are provided, rather than a rigid connection, in order to serve as a shock absorbing medium during advancement and retraction of the jacks 124 and 125 within their respective slideways 155 and 157.

Radius rod means 148 likewise serves to support the guide frame means 145 in horizontally extending position from the frame B and preferably comprises a first rod 170 secured to the frame B, a second rod 171 secured to the guide frame means 145, and spring means 172 interconnecting the rods 170 and 171. This radius rod means 148 serves to position the slideways 155 and 157 radially from the pivot means L. The spring mounting means 172 is provided to act as a shock absorber between the guide frame means 145 and frame B upon advancement and retraction of the jacks 124 and 125 within their respective slideways 155 and 157.

The power means H preferably includes an electric motor 175, mounted within the chamber 24 of the frame B, which drives a pump 176 and a transmission 177. Conventional electric connections (not shown) are provided through a junction box 179 for actuating the motor 175. The pump 176 is suitably interconnected within the hydraulic system R, as will be subsequently described. The transmission 177 is provided with a drive sprocket 180 about which is entrained the drive chain 69. The sprocket 180 provides the driving power for the drive chain 69.

The base means K of the bridge conveyor J is of general segmental shape and preferably includes a base plate 185, a top plate 186, side plate 187, and suitable cross braces 190. A bracket 192 may be provided to one side of the base frame K, the bracket 192 having openings 193 and 194 for respective mounting of the conveyor advancing and retracting means O and conveyor transverse positioning means P, as will be subsequently described.

The cover plate 186 is provided with a depressed portion 195 for receiving the conveying means N in juxtaposition with respect to the conveying means D of the frame B for the conveying of material mined onto the bridge conveyor J. Bearings 197 and 198 are each preferably supported upon an upper track 200 and a lower track 201 within the base frame J. The bearings 197 and 198 are slidably supported upon their respective tracks and are movable along the tracks by threaded shaft interconnections 205. The bearings 197 and 198 support an idler roller 206 having a centrally disposed sprocket 207 about which may be entrained the chain of a chain flight conveyor which may comprise the conveying means N. Adjustability is provided by the sliding of the bearings 197 and 198 upon their respective tracks so that slack may be taken out of the conveying chain. A suitable conduit, such as the conduit 208 of the bearing 198 may be provided leading to the exterior of the base frame K for lubrication of the bearings, or openings 209 having a cover plate 210, such as that shown adjacent the bearing 197 in FIG. 11, may be provided for lubrication of the bearings. Bracket 192 has been omitted in FIG. 10 in order to show structure that would otherwise be obscured thereby.

Figure 15:
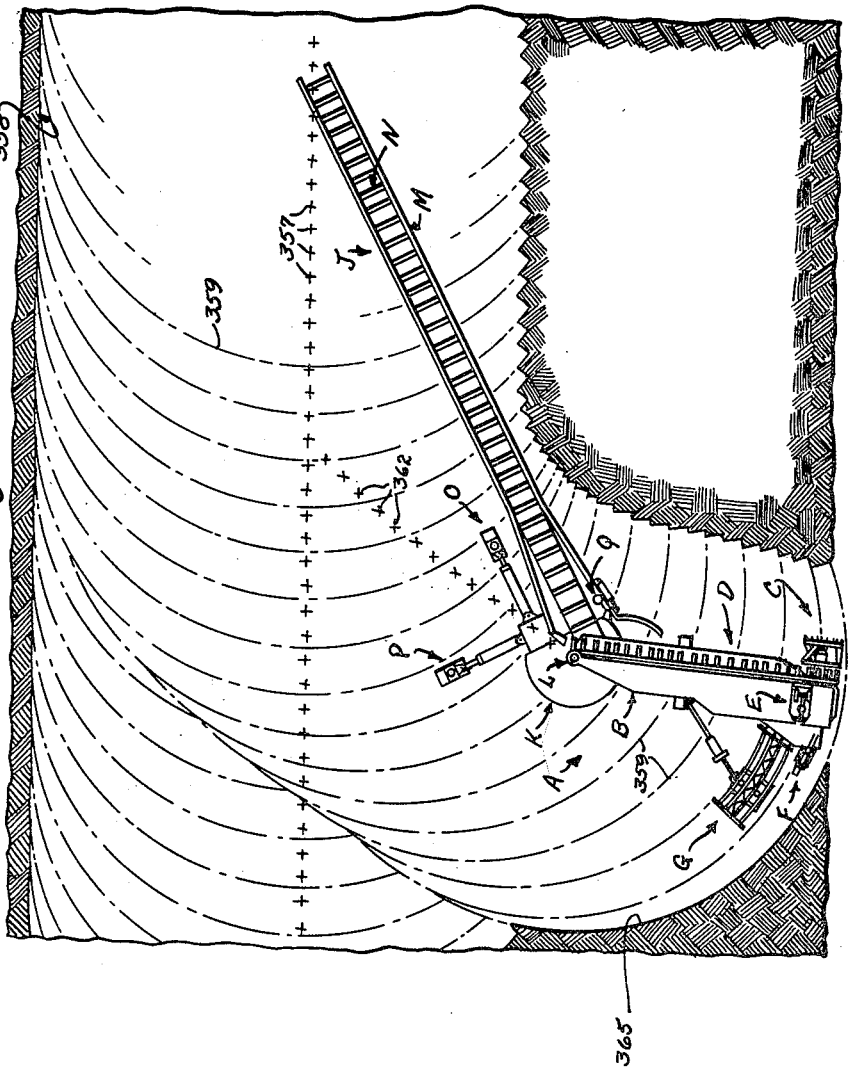

A suitable baffle 212 may be provided extending vertically upwardly from the base means K, opposite the side of the base means K from which the frame B extends, providing a stop for the mined material as it is discharged from the conveying means D of the frame B to maintain it in juxtaposition for receipt upon the conveying means N of the bridge conveyor J. The baffle 212 is provided with a pivotal mounting 214 upon the base means K; a bracket 215 is secured to the baffle 212 and provides a mount for attachment of the shaft 216 of a hydraulic cylinder 217 that is pivotally mounted as at 218 upon a bracket 219 secured to the conveying frame M of the bridge conveyor J. Thus, as the frame B moves about the pivot means L, to the position as shown in FIG. 15, hydraulic cylinder 17 may be actuated, drawing baffle 212 arcuately away from the base means K, so that the baffle 212 does not interfere with movement of the frame B.

Pivot means L preferably comprises a cup-like bracket 220 that is welded or otherwise secured to the cover plate 186 of the base frame means K, having a depression 221 within which is received a plate 222 that is welded or otherwise secured within the depression 221 such as by bolts 223. Mounted upon the plate 222, and extending vertically upwardly therefrom is a shaft 225. The shaft 225 is provided with suitable ridges 227 for receiving a self-aligning bushing 228 in proper position thereupon, a retaining plate 229 being secured to the top of the shaft 225 such as by means of bolt 230 retaining the self-aligning bushing 228 in juxtaposition upon the shaft 225. Sleeve 34 of the plate 30 is provided with a socket portion 232 which is received about the self-aligning bushing 228, and maintained in position within the sleeve 34 by retaining ring 233. This construction provides for free pivotal movement of the sleeve 34 about the shaft 225, the adjoining structure being somewhat in the nature of a universal joint providing for the compensation of a degree of vertical, horizontal, and angular misalignment.

The conveying frame M and its associated conveying means N are preferably a modified form of that disclosed in Patent No. 2,747,721, dated May 29, 1956, of which John B. Long and Richard J. Frye are patentees. The same includes side frames 235 and 236 that may be convergently angled as at 237 adjacent the base means K; and a bottom plate 238 upon which may be received conveying means N, the side frames 235 and 236 and the base plate 238 defining an elongated channel 240 through which the material may be conveyed from the base means K to the main or room conveyor 242. The discharge end 243 of the bridge conveyor J may be mounted upon a carriage 245, as disclosed in the previously mentioned Patent No. 2,747,721. The conveying means N may be of any suitable type, such as the chain and flight disclosed in the previously mentioned Patent No. 2,747,721, or of the belt type, the receiving end thereof being entrained about the idler roller 206 of the base means K, with the conveying reach thereof passing through the depression 195 in the base means K, and along the conveying frame means M to appropriately discharge at the end 243 of the conveying frame M. Bridge conveyor J will include a conventional power source and supply (not shown) for driving the conveying means N.

The conveying frame M is preferably rigidly secured to the base means K, and for all intents and purposes the base means K may be considered a portion of the bridge conveyor J.

The conveyor advancing and retracting means O preferably comprises a hydraulic cylinder 248 that is attached at one end thereof by bracket 249 to the bracket 192 of the base means K, and is attached at the other end thereof to a roof jack 250. The hydraulic cylinder 248 is provided with a plate 251 at one end thereof and a plate 252 at the other end thereof, the plate 251 being provided with springs 254 which are anchored to the bracket 192 of the base means K and the plate 252 being provided with springs 255 which are anchored to the jack 250. The hydraulic cylinder 248 is thus permitted pivotal movement with respect to the jack 250 and the bracket 192, such as may occur under pressure when conveyor advancing and retracting means O and P are simultaneously operated, and when the pressure is released the springs 254 and 255 will realign the cylinder 248 in juxtaposition with respect to the jack 250 and bracket 192, in the position shown in the drawings.

The jack 250 may be of construction identical to that of the jacks 124 and 125 previously disclosed, and the pivotal interconnection of the jack 250 to the hydraulic cylinder 248 is preferably of the same type that has been previously disclosed with respect to the hydraulic cylinders 130 and 131, the same being shown in FIG. 8.

The conveyor advancing and retracting means O will be utilized for linear movement of the base means K. In such operation, the jack 250 will be raised so that the lower portion thereof is in contact with the mine floor and the upper portion thereof in contact with the mine roof, and the hydraulic cylinder 248 extended, which will advance the base means K. After it has been advanced through one stroke of the hydraulic cylinder 248, and in the event it is desired to further advance the base means K, the roof contacting portion of the jack 250 is lowered, the hydraulic cylinder 248 retracted, which draws the jack 250 toward the base means K, the jack 250 actuated so that the base there of is in contact with the mine floor and the upper portion thereof in contact with the mine roof, and the hydraulic cylinder 248 again extended. Retraction of the base means K will be by the reverse action, as is obvious. We have thus provided for a step-by-step advancing of the base means K through what is known as a "walking jack" 250.

The conveyor transverse positioning means P is secured to the bracket 192 of the base K, normal to the bridge conveyor J, and is of identical construction as the conveyor advancing and retracting means O, and like reference characters with a prime character have therefore been applied. This conveyor transverse positioning means P is utilized for lateral movement of the base frame K, the operation thereof being the same as that previously described with respect to the conveyor advancing and retracting means O.

It will be noted that by simultaneous activation of the means O and P, each being extended to the desired degree, that the base frame K may be angularly moved. After the desired angular movement has been reached and jacks 250 and 250′ retracted, springs 254, 255, 254′ and 255′ will act to realign jacks 250 and 250′ with bracket 192.

The conveyor anchoring means Q preferably includes a hydraulic jack 258 secured to the conveying frame M of the bridge conveyor J, adjacent the base means K, the jack 258 having a base 259 and a top plate 260. In operation, the base means K is positioned within the mine by means of the conveyor and retracting means O and conveyor transverse positioning means P, and the jack 258 extended, with the base 259 thereof in contact with the mine floor and the top plate 260 thereof in contact with the mine roof. When the jack is so positioned it will securely anchor the base means K in its desired position for movement of the frame B about the pivot means L.

The hydraulic system R preferably includes the hydraulic fluid supply tank 265, hydraulic pump 176, three speed control valve action means 266, and control valve banks 267 and 268. The tank 265 may be of any conventional type for storage of hydraulic fluid and is preferably mounted within the chamber 24 of the frame B.

Pump 176 is a conventional tandem type gear pump having one-half inch gear sections 270 and 271 and three-quarter gear sections 273 and 274, all of which sections are driven by a single shaft 275 of the motor 175. Fluid supply lines 277 and 278 are provided leading from the tank 265 to the tandem pump 176.

The three speed control valve means 266 preferably includes a pair of high volume flow valves 281 and 282 interconnected for simultaneous actuation by plate 283; low volume flow valves 285 and 286 interconnected for simultaneous actuation by plate 287; and a control lever 290. As shown in FIG. 12, the lever 290 is in neutral, which will provide high volume flow of fluid to the valve banks 267 and 268. In such position, fluid will flow from the pump sections 270, 271, 273 and 274 through their respective conduits 291, 292, 293, and 294 to their respective valves 285, 286, 281, and 282. The fluid flow from valve 281 is conveyed through conduit 295 to join the flow of fluid through valve 285, the joined flow passing through conduit 296 to valve bank 267; and the flow of fluid through valve 282 passing through conduit 298 to join the flow of fluid through valve 286, the joined flow of fluid passing through conduit 299 to valve bank 268. This joint flow of fluid provides a high speed flow to the valve banks 267 and 268.

When it is desired to provide a medium volume of hydraulic flow the lever 290 is moved toward the valves 285 and 286 (to the right in FIG. 12). Such movement of the lever 290 permits continued flow of fluid through the valves 281 and 282, through conduits 295 and 298, and through conduits 296 and 299 to the respective valve banks 267 and 268. In this position, however, the valves 285 and 286 are closed, so that fluid supplied thereto through the conduits 291 and 292 flows through conduits 300 and 301 back to the tank 265.

When it is desired to operate the various mechanism at low speed, the lever 290 is moved toward the valves 281 and 282 (to the left in FIG. 12). In such position, low volume fluid flows through the conduits 291 and 292 into valves 285 and 286, passes through conduits 298 and 299 into the respective valve banks 267 and 268, and the flow of fluid through conduits 293 and 294, to the valves 281 and 282, is diverted through conduits 303 and 304 and thence through conduits 300 and 301, back to the tank 265.

Valve banks 267 and 268 are each provided with conventional relief valves and have respective conduits 307 and 308 for dumping fluid back to the tank 265 in the event of over-load and when all of the fluid flow into the valve banks is not required for actuation of the desired mechanism.

Valve bank 267 is provided with sections 310, 311, 312, 313, 314, and 315 that may be individually actuated; and valve bank section 268 is provided with sections 316, 317, 318, 319, 320, 321, and 322 that may be individually actuated.

Valve bank section 310 is provided with a pair of conduits 325 and 326 for actuation of the rear guide cylinder 113; valve bank section 311 is provided with conduits 327, and 328 for the actuation of the baffle cylinder 217; valve bank section 312 is provided with conduits 329 and 330 for actuation of the transverse positioning cylinder 248'; valve bank section 313 is provided with conduits 331 and 332 for actuation of the advancing and retracting cylinder 248; valve bank section 314 is provided with conduits 333 and 334 for actuation of the advancing and retracting cylinder 131; and valve bank section 315 is provided with conduits 335 and 336 for actuation of the advancing and retracting cylinder 130.

Insofar as valve bank 268 is concerned, valve bank section 316 is provided with conduits 337 and 338 for actuating of the cylinder which actuates the overload clutch (not shown) in the main drive transmission 177 for activating and deactivating chain drive chain 69; valve bank section 317 is provided with conduits 339 and 340 for actuation of the front guide cylinder 96; valve bank section 318 is provided with conduits 341 and 342 for actuation of the anchor cylinder 258; valve bank section 319 is provided with conduits 343 and 344 for actuation of the jack 259'; valve bank section 320 is provided with a pair of conduits 345 and 346 for actuation of the anchor cylinder 259; valve bank section 321 is provided with conduits 347 and 348 for actuation of the anchor 125; and valve bank section 322 is provided with conduits 349 and 350 for actuation of the jack 124.

It will thus be seen that we have provided for the individual actuation of the various hydraulic mechanism of our invention and have further provided that such mechanism may be operated at either a low speed, medium speed or high speed.

In the operation of the miner A, the frame B and bridge conveyor J are preferably separately conveyed to a position adjacent the area that is to be mined, and then the frame B connected to the base means K, at the pivot means L, the discharge end 243 of the bridge conveyor positioned for discharge onto a room conveyor 242, the conveyor advancing and retracting means O and conveyor transverse positioning means P actuated to properly position the pivot means L; the jack 258 extended into abutment with the mine floor and mine roof, anchoring the base means K and pivot means L securely in position; the front guide means E raised into abutment with the mine roof; rear guide means F positioned in abutment with the mine floor for the desired vertical disposition of cutting means C; the cutting means C and conveying means D actuated; and the conveying means N actuated. At this initial point of operation the frame B will be substantially normal to the bridge conveyor J, as shown in FIG. 1.

Jack 124 is then actuated so that the base thereof is in contact with the mine floor and the top plate thereof in contact with the mine roof, and the cylinder 130 is extended. This will serve to move the frame B about pivot means L (in a counterclockwise direction as shown in the drawings). Jack 125 is then actuated so that the base thereof is in contact with the mine floor and the top plate thereof in contact with the mine roof, and jack 124 simultaneously deactivated, lowering the top plate 129 from the anchored position against the mine roof; the cylinder 130 is then retracted and the cylinder 131 extended. The jack 124 is then again actuated, placing the base in forced abutment with the mine floor and the top plate thereof in forced abutment with the mine roof; the jack 125 simultaneously lowered, so that the top plate thereof is out of forced contact with the mine roof; and the cylinder 130 is again extended, simultaneous with the retraction of cylinder 131. This procedure, being a step-by-step advance of the base frame B about the pivot means L is repeated until the frame B has completed substantially a one hundred and eighty degree movement or sweep about the pivot means L.

After a complete one hundred and eighty degree of the frame B with respect to the pivot means L has been accomplished, frame B is retracted to its original position, substantially normal to the bridge conveyor J by reverse actuation of the jacks 124 and 125 and cylinders 130 and 131 from that previously described, and cylinder 248 is actuated for moving the base means K forward to a new position. Such advance movement may be a distance substantially equal to the radius or diameter of the cutting means C, dependent upon the hardness of the material being mined. As shown in FIG. 13 the advance has been substantially equal to the diameter of the cutting means C, and as shown in FIGS. 14 and 15 the advance has been substantially equal to the radius of the cutting means C. For instance, if the diameter of the cutting drum is twenty-seven inches, movement of the pivot means L forward should be substantially either thirteen and a half inches or twenty-seven inches, as required.

As is shown in FIG. 13, the advance of a distance substantially equal to the diameter of the cutting means C will leave upper ridges 355 and lower ridges 356 projecting respectively from the mine roof and mine floor. Such ridges will be contacted respectively by the upper trimmer bar 56 and bottom trimmer bar 48, which will substantially break these ridges away from the seam and the material thus broken will be scooped through the opening 50 and into contact with the conveying means D. This opening 50 will likewise scoop up any mined material that may have been cut by the cutting means C and not directly discharged into contact with the conveying means D.

As shown in FIGS. 14 and 15, the miner A is advanced substantially linearly, with the pivot means L being disposed at the spaced centers 357 for each sweep of the frame B until the desired depth of the room 358 has been mined. The arcuate dot and dash lines 359 of FIGS. 14 and 15 indicate the forward reach of the cutting means C during every other sweep of the frame B, and the dotted lines 360 indicate the future sweeps of the forward reach of the cutting means C.

Breakthroughs are made at appropriate places as the room is advanced. When a position in the room has been reached for a breakthrough, the conveyor advancing and retracting means O and conveyor transverse positioning means P are actuated to position the pivot means L in the desired location, the steps of which are indicated at the positions 362 in FIGS. 14 and 15. FIG. 14 indicates the mining of an advanced breakthrough 364 and FIG. 15 the mining of a rearward breakthrough 365.

Various changes may be made to the form of invention herein shown and described and the method of use thereof without departing from the spirit of the invention or the scope of the following claims.

We claim:

1. In a continuous miner mounted on supporting means, the combination of base means, a longitudinally extending frame, pivot means pivotally interconnectnig said frame with said base means, cutting means mounted upon said frame and extending laterally to one side thereof, conveying means mounted upon said frame, said conveying means being positioned with respect to said cutting means for receipt and conveying of material from said cutting means and positioned for discharge of the material onto said base means, guide means secured to said frame, said guide means including support means extending laterally from said frame at the side thereof opposite to said cutting means, said frame, support means and cutting means comprising a lever and the means for supporting said miner comprising a fulcrum for said lever, said frame abutting the fulcrum of said lever, said support means and said cutting means constituting arms of said lever extending to opposite sides of said frame, said guide means including means secured to said support means adjacent the end thereof laterally extendant from said frame for the application of a force adjacent the end of said support means laterally extendant from said frame, the force of said means being applicable for the guiding and tilting of said lever about its fulcrum, and advancing and retracting means mounted upon said frame for moving said frame about said pivot means.

2. The combination as specified in claim 1 wherein said means secured to said support means adjacent the end thereof laterally extendant from said frame includes bracket means, means for pivotally mounting said bracket means upon said support means, wheel means rotatably supported by said bracket means in juxtaposition for engaging a base surface, and means for pivotally moving said wheel means with respect to said support means, said last mentioned means providing for the adjustable disposition of said wheel means in base surface engaging relationship with respect to said support means, and providing the force for the guiding and tilting of said lever about its fulcrum.

3. The combination as specified in claim 2 including a second guide means, means for pivotally securing said second guide means to said frame, said second guide means being positioned upon said frame for engagement of a surface opposite that engaged by said wheel means, and means for positioning said second guide means in surface engaging relationship, said first and second mentioned guide means cooperating to guide said cutting means.

4. The combinaiton as specified in claim 1 wherein said advancing and retracting means includes guide bracket means mounted upon said frame and extending laterally outwardly from said frame, said guide bracket means including slideway means, anchor means slidably mounted within said slideway means, and means interconnecting said anchor means and said frame for selectively advancing and retracting the anchor means with respect to said frame.

5. In a continuous miner, the combination of base means, a longitudinally extending frame, pivot means pivotally interconnecting said frame with said base means, cutting means mounted upon said frame and extending laterally to one side thereof, conveying means mounted upon said frame, said conveying means being positioned with respect to said cutting means for receipt and conveying of material from said cutting means and positioned for discharge of the material onto said base means, a first surface engaging guide means mounted upon said frame, a second surface engaging guide means pivotally mounted upon said frame, said second mentioned guide means being positioned upon said frame for engaging a surface opposite the surface engaged by said first mentioned guide means, and means interconnecting said frame and said second guide means for providing adjustable engagement of said second guide means with the surface against which it abuts, said first and second mentioned guide means co-operating for the guiding of said continuous miner, and advancing and retracting means mounted upon said frame for moving said frame about said pivot means in a guided relationship.

6. In a continuous miner, the combination of base means, a longitudinally extending frame, pivot means pivotally interconnecting said frame with said base means, cutting means mounted upon said frame and extending laterally to one side thereof, said frame including a conveyor pan defining a channel extending substantially parallel to said frame and for substantially the major length of said frame, said channel having an opening adjacent said cutting means that extends from said cutting means substantially parallel to and for a minor length of said frame, said channel having a second opening remote from said cutting means for discharge onto said base means, and conveying means mounted upon said frame in cooperative relationship with respect to said conveyor pan for conveying material from said cutting means to said base means, a trimmer bar mounted upon said conveyor pan, adjacent said cutting means and extendant outwardly from said first mentioned opening, for removing material adjacent said cutting means that may have been missed by said cutting means in a previous pass and aiding in the guiding of mined material onto said conveyor pan, guide means secured to said frame for guiding said frame in a pivotal mining sweep about said pivot means, and advancing and retracting means mounted upon said frame for moving said frame about pivot means.

7. The combination as specified in claim 6 wherein second trimmer bar is mounted upon said frame, adjacent said cutting means and vertically spaced from said first mentioned trimmer bar, for removing material adjacent said cutting means and opposite to the material acted upon by said first mentioned trimmer bar that may have been missed by said cutting means in a previous pass.

8. In a continuous miner, the combination of base means, a longitudinally extending frame, pivot means pivotally interconnecting said frame with said base means, cutting means mounted upon said frame and extending laterally to one side thereof, conveying means mounted upon said frame, said conveying means being positioned with respect to said cutting means for receipt and conveying of material from said cutting means and positioned for discharge of the material onto said base means, a second conveying means positioned upon said base means for receipt of material from said first mentioned conveying means and transfer of the received material to a position remote from the miner, transverse positioning means secured to said base means, said transverse positioning means being secured to said base means in juxtaposition for movement of said base means and said second conveying means transversely to the longitudinal axis of said second conveying means, said transverse positioning means including anchor means, and means interconnecting said anchor means and said base means for selectively advancing and retracting said anchor means with respect to said base means and for selectively advancing and retracting said base means with respect to said anchor means, guide means secured to said frame, and advancing and retracting means mounted upon said frame for moving said frame about said pivot means.

9. In a continuous miner, the combination of base means, a longitudinally extending frame, pivot means pivotally interconnecting said frame with said base means, cutting means mounted upon said frame and extending laterally to one side thereof, conveying means mounted upon said frame, said conveying means being positioned with respect to said cutting means for receipt and conveying of material from said cutting means and positioned for discharge of the material onto said base means, a second conveying means positioned upon said base means for receipt of material from said first mentioned conveying means and transfer of the received material to a position remote from the miner, advancing and retracting means secured to said base means for advancing and retracting said base means and said second conveying means lineally with respect to the longitudinal axis of said second conveying means, said advancing and retracting means including anchor means and means interconnecting said anchor means and said base means for advancing and retracting said anchor means with respect to said base means and for advancing and retracting said base means with respect to said anchor means, transverse positioning means secured to said base means, said transverse positioning means being secured to said base means in juxtaposition for movement of said base means and said second conveying means transversely to the longitudinal axial of said second conveying means, said transverse positioning means including anchor means, and means interconnecting said anchor means for selectively advancing and retracting said anchor means with respect to said base means and for selectively advancing and retracting said base means with respect to said anchor means, guide means secured to said frame, and advancing and retracting means mounted upon said frame for moving said frame about said pivot means.

10. In a continuous miner, the combination of a base means, a longitudinally extending frame, pivot means pivotally interconnecting said frame with said base means, cutting means mounted upon said frame and extending laterally to one side thereof, conveying means mounted upon said frame, said conveying means being positioned with respect to said cutting means for receiving and conveying of material from said cutting means and positioned for discharge of the material onto said base means, a second conveying means positioned upon said base means for receipt of material from said first mentioned conveying means and transfer of the received material to a position remote from the miner, guide means secured to said frame, and advancing and retracting means mounted upon said frame for moving said frame about said pivot means, said base means including a baffle, means for pivotally mounting said baffle with respect to said base means, said baffle comprising a plate extending about a portion of said base means and vertically upwardly from said base means adjacent the point of discharge of said first conveying means onto said base means, and means for pivotally moving said baffle away from said base means as said frame approaches said baffle in pivoting movement about said pivot means.

References Cited by the Examiner
UNITED STATES PATENTS

| | | |
|---|---|---|
| 1,478,280 | 12/23 | Holmsted. |
| 1,493,701 | 5/24 | Quaas. |
| 1,638,447 | 8/27 | Levin. |
| 2,692,130 | 10/54 | Ruth. |
| 2,761,666 | 9/56 | Heimaster et al. |
| 2,777,681 | 1/57 | Ball. |
| 2,833,531 | 5/58 | Joy. |
| 2,916,274 | 12/59 | Haworth et al. |
| 2,933,294 | 4/60 | Meehan. |
| 3,053,455 | 9/62 | McLaughlin et al. |

BENJAMIN HERSH, *Primary Examiner.*